H. F. BODEKER.
MILKING MACHINE.
APPLICATION FILED AUG. 4, 1919.

1,396,987. Patented Nov. 15, 1921.

Witness
Inventor
Henry F. Bodeker
By Erwin Winter & Howard
Attorneys

UNITED STATES PATENT OFFICE.

HENRY F. BODEKER, OF MILWAUKEE, WISCONSIN, ASSIGNOR TO B-V. MILKING MACHINE COMPANY, OF MILWAUKEE, WISCONSIN, A CORPORATION OF WISCONSIN.

MILKING-MACHINE.

1,396,987. Specification of Letters Patent. Patented Nov. 15, 1921.

Application filed August 4, 1919. Serial No. 315,047.

*To all whom it may concern:*

Be it known that I, HENRY F. BODEKER, a citizen of the United States, residing at Milwaukee, county of Milwaukee, and State of Wisconsin, have invented new and useful Improvements in Milking-Machines, of which the following is a specification.

My invention relates to improvements in milking machines.

The object of my invention is to provide means whereby the milking operation may be more effectually controlled to suit the requirements of the individual cows. Also to provide a sanitary milk straining claw chamber, adapted to prevent clotted or gargetty milk from clogging the ducts or valves associated with the releaser chamber.

In the drawings:—

Like parts are identified by the same reference characters throughout the several views.

Figure 1:
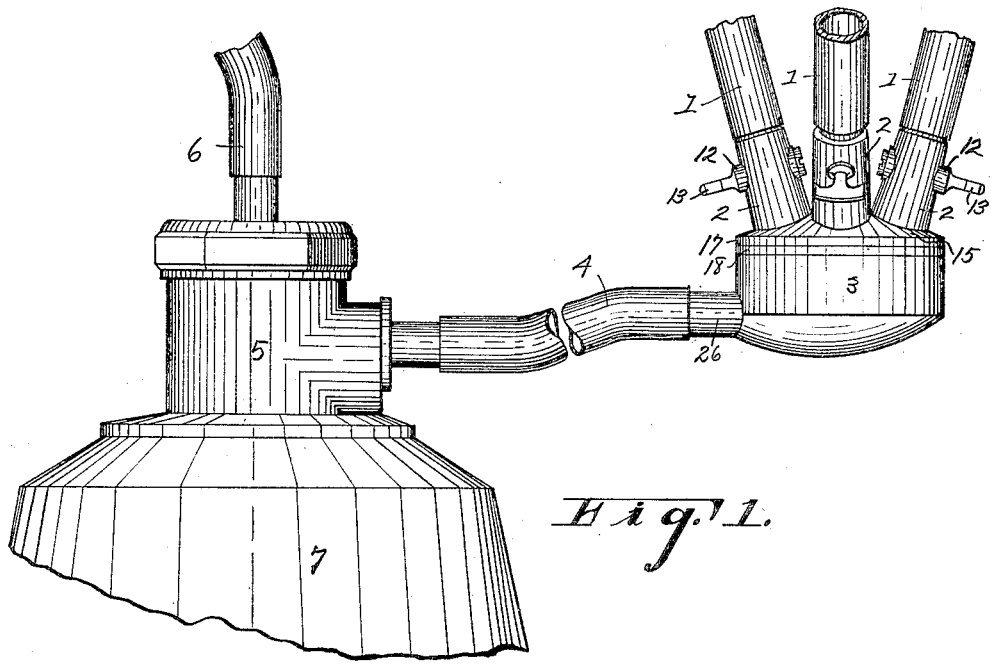
Figure 1 is a fragmentary view of a milking machine, showing the releaser chamber and the teat cup claw in elevation.

The milk is drawn from teat cups, (not shown), through a set of rubber tubes 1 and nipples 2 into the claw chamber 3, and from this chamber it passes through a flexible tube 4 into a releaser chamber 5 to which the suction is applied through a section tube 6. The releaser chamber may be of any ordinary construction adapted to receive the milk when the air is withdrawn through the tube 6, and to subsequently allow the milk to drop into a receiver 7 when the suction is relieved. The general organization of the machine being well known in the art, further description is deemed unnecessary, except as to the features of my invention herein claimed.

The nipples 2 are each provided with a manually operable valve 12, having a suitable handle 13, whereby the suction may be separately cut off from the respective teat cups, or independently extended to a teat cup as soon as it is adjusted in position, without waiting until the other cups are adjusted. These valves 12 being located in the claw chamber nipple 2, and the nipples 2 being made detachable by either screwing them, or otherwise securing them to the claw chamber cap 15, it is obvious that they may be easily cleaned and kept in a perfectly sanitary condition.

The claw chamber cap is screwed into the body of the chamber, the cap having a depending flange 16 for this purpose. The cap is also provided with a radially projecting flange 17, adapted to engage a rubber gasket 18 between it and the top of the body 3 of the claw chamber. A ring 20 is mounted in the claw chamber below the cap flange 16. This ring carries a screen 21 formed of closely woven wire. The margins of the screen are soldered to the ring at 22. When the cap is removed, this ring with the screen 21 may also be removed and cleansed.

The body of the claw chamber is provided with a central cavity 24 having an outlet duct 25, which extends through a protecting nipple 26, adapted to facilitate the attachment of the hose 4.

Figure 2:
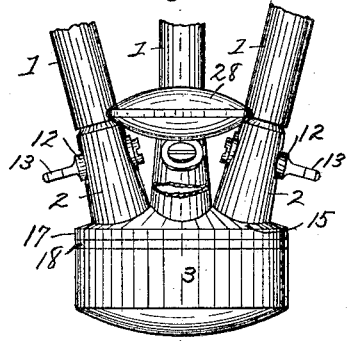
Fig. 2 is a detail view of the teat cup claw, viewed at right angles to its position illustrated in Fig. 1.
Figure 3:
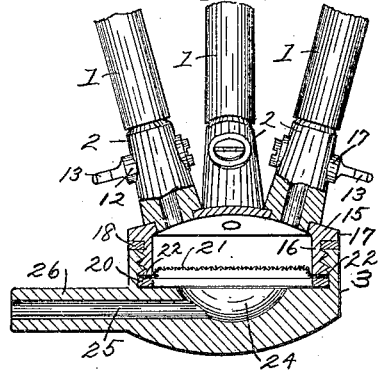
Fig. 3 is a vertical sectional view of the same.
Figures 4, 5, 6:
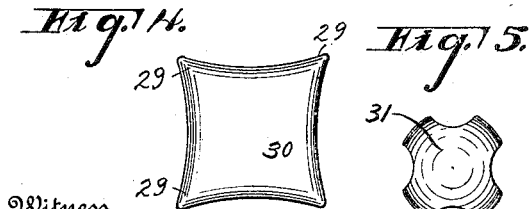
Figs. 4 and 5 are detail views of claw weighting members of differing size.
Fig. 6 is a detail sectional view of the regulating valve.

The claw chamber is preferably provided with a detachable weight. The construction of my improved claw chamber with the nipples 2 enables me to employ a weight 28 which is adapted to fit between the upper ends of the nipples, the weight being provided with rounded prongs or projections 29 to engage between the nipples on the claw chamber, substantially as illustrated in Fig. 2.

A series of weights 30—31, of differing size or character of material may be provided, whereby the mechanical pull upon the teats may be varied to suit the requirements of different cows. I have discovered that the suction tension causes the cups and the claw to lift, and that when the suction is wholly or partially relieved, the downward pull of the weight upon the relaxed teat is a considerable factor in promoting a complete discharge of the milk from the udder. This is probably due to the fact that the downward pull of a proper degree of load upon the relaxed teat allows the teat to refill from the udder, and during the next suction period the milk from the refilled teat will, of course, be drawn into the cup.

I have further discovered that the degree of mechanical pull upon the teat during the period of relaxation should be varied to suit the requirements of different cows, and by varying the load in accordance with such requirements, it is possible to complete the milking operation so effectually as to avoid the necessity for manual stripping operations, such as have heretofore been universally considered necessary in cases where milking machines are used.

It is desirable that means be provided for regulating the degree of vacuum to be produced in the teat cups during the milking operation. For this purpose I employ a screw valve 32 threaded into a tubular stud 33, on the claw chamber cap 15 the valve and interior wall of the stud having channels 34 and 35 respectively. The channels can be brought into and out of registry, and into any desired degree of registry, by rotation of the valve. When in registry air may be slowly admitted to the claw. The form of the ducts is such that the quantity of air thus admitted may easily be very exactly regulated by rotating the screw to raise or lower it in the stud.

I claim:—

1. The combination with a milking machine claw, provided with a series of inlet nipples, each having a manually operable valve, and also provided with an outlet nipple, of a detachable weight member adapted for loose interlocking engagement with the claw nipples, said valves being adapted to allow the suction to be applied in one cup to support the weighted claw, while the other cups are being adjusted in position for use.

2. The combination with a milking machine claw, provided with valved inlet nipples, and an outlet nipple, of means for increasing or decreasing the weight of the claw to suit the requirements of the cow to be milked.

3. The combination with a milking machine claw, provided with valved inlet nipples, and an outlet nipple, of means for increasing or decreasing the weight of the claw to suit the requirements of the cow to be milked, said means comprising a series of weights, each adapted to be detachably connected with the claw.

4. A milking machine claw including the combination of a lower portion provided with an outlet nipple, an upper portion provided with inlet nipples and adapted for detachable connection with the lower portion, a washer adapted to be engaged between said upper and lower portions, a screen supported from the washer, and a manually operable valve mounted upon said upper portion whereby the vacuum therein may be relieved to any desired amount.

5. A milking machine claw including the combination of a casing made in two separable portions, means for securing said portions together, a screen adapted to be supported between said portions, an outlet nipple and a set of inlet nipples in communication with the interior of the casing, and a manually operable valve whereby the vacuum within the casing may be relieved to any desired amount.

6. In a milking machine, a claw chamber having an air inlet port, and a screw threaded regulating valve adapted to progressively open or close said port.

In testimony whereof I affix my signature in the presence of two witnesses.

HENRY F. BODEKER.

Witnesses:
O. CURLER,
A. J. McKERIHAN.